United States Patent [19]

Skinner et al.

[11] Patent Number: 4,619,555
[45] Date of Patent: Oct. 28, 1986

[54] SLIPLINE ADJUSTABLE MANHOLE SEAL

[75] Inventors: Harry W. Skinner; James W. Skinner, both of Fort Wayne, Ind.; William O. Skinner, Baraboo, Wis.; William P. O'Donnell, Wilmington, Del.

[73] Assignee: Press-Seal Gasket Corporation, Fort Wayne, Ind.

[21] Appl. No.: 644,387

[22] Filed: Aug. 27, 1984

[51] Int. Cl.⁴ ............................................. F16L 1/00
[52] U.S. Cl. ..................................... 405/154; 138/97; 285/138
[58] Field of Search ............... 405/155, 154, 158; 138/97; 285/189, 236, 138; 277/1, 164

[56] References Cited

U.S. PATENT DOCUMENTS

| | | | |
|---|---|---|---|
| 2,500,601 | 3/1950 | Butler | 138/97 |
| 3,123,101 | 3/1964 | Blount et al. | 138/97 |
| 3,221,758 | 12/1965 | Morse | 138/97 |
| 3,543,377 | 12/1970 | Bremner | 138/97 X |
| 4,170,248 | 10/1979 | Bennett et al. | 138/97 |
| 4,242,164 | 12/1980 | Skinner | 264/148 X |
| 4,478,437 | 10/1984 | Skinner | 285/189 |

Primary Examiner—Dennis L. Taylor
Attorney, Agent, or Firm—Pearne, Gordon, Sessions, McCoy, Granger, & Tilberry

[57] ABSTRACT

Improvements in the technique of sliplining a buried pipe, so as to minimize adverse affects of differences in expansion and contraction of the old and new pipe, while maintaining seals at the ends thereof is disclosed employing at each pipe end a sleeve-like pliable gasket, which is expanded outwardly into contact with the inner surface of the old pipe, and somewhat beyond the end of the old pipe, is contracted inwardly into contact with the other surface of the new or sliplined pipe. The sleeve-like gasket can compensate for thermally induced pipe line and liner axial length changes, without breaking the seal between the two, while seal installation is facilitated by the accessability of the sleeve-like gaskets extending beyond the ends of the old pipe.

15 Claims, 3 Drawing Figures

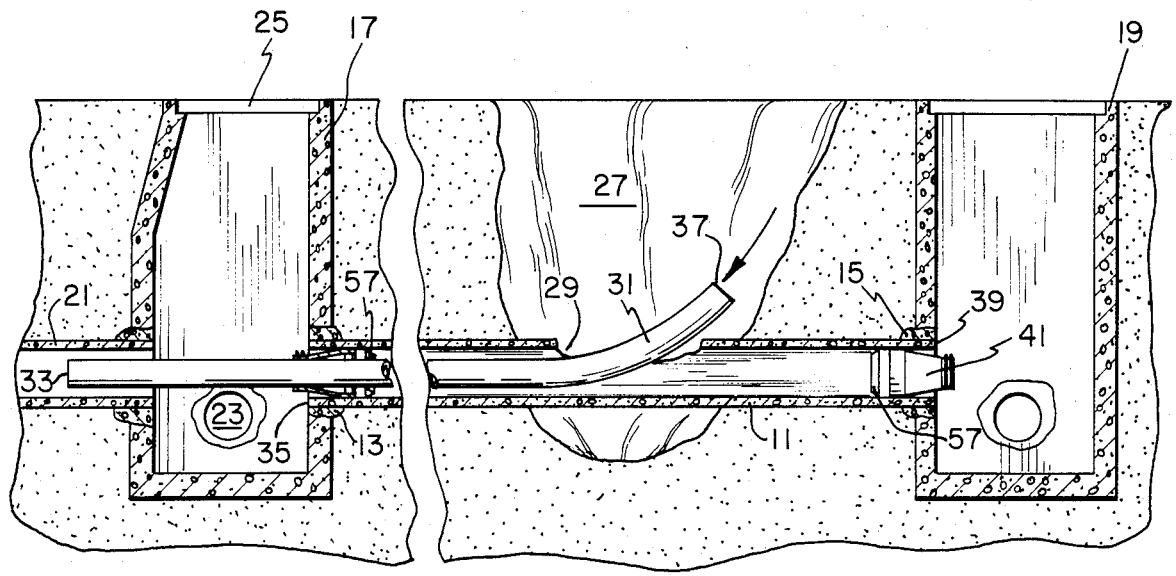
FIG_1
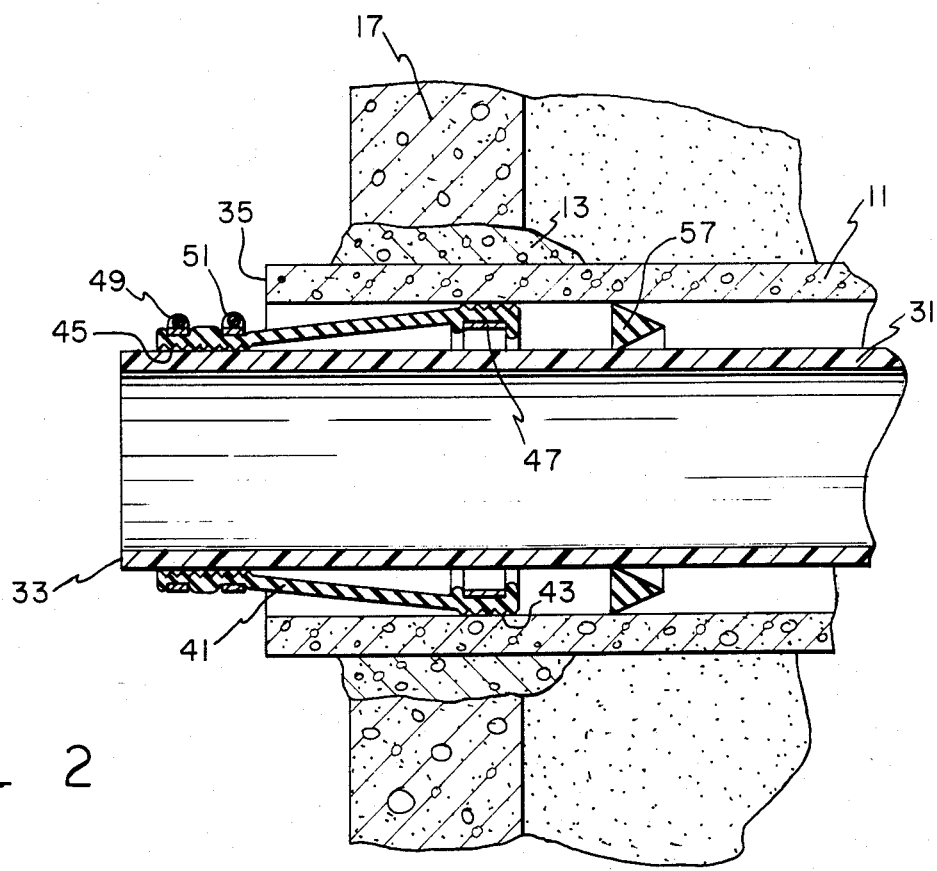
FIG_2

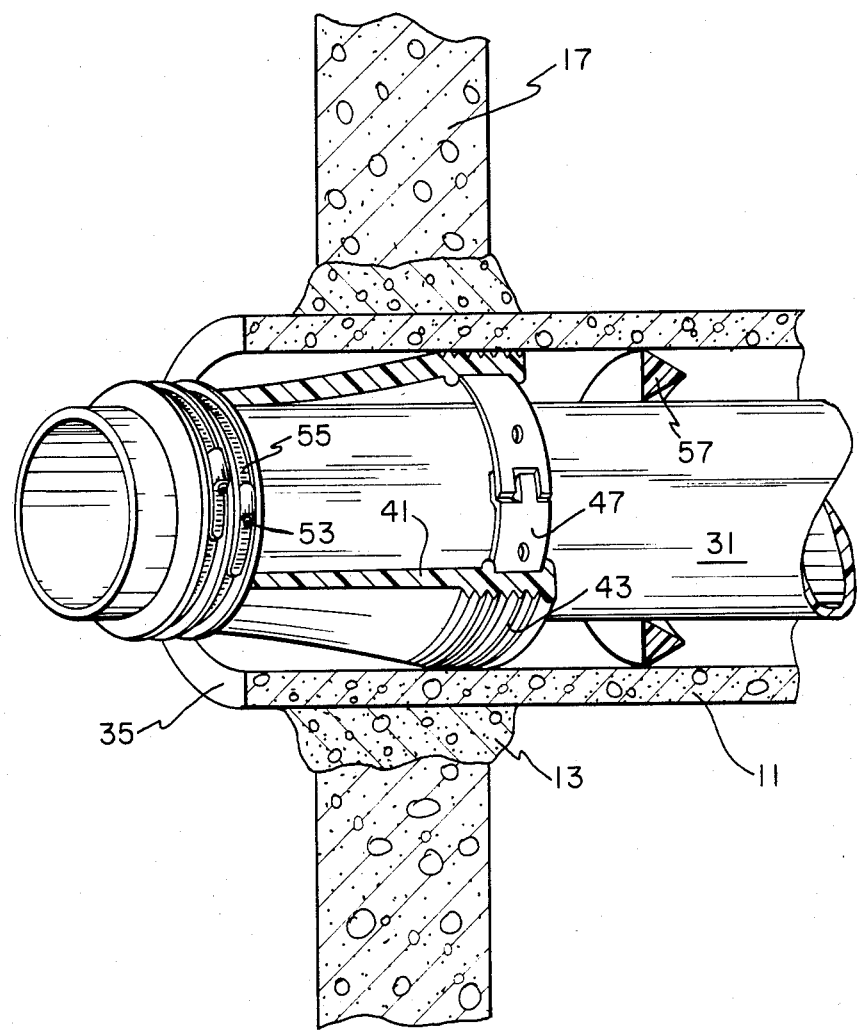
FIG_3

SLIPLINE ADJUSTABLE MANHOLE SEAL

SUMMARY OF THE INVENTION

The present invention relates, generally, to sealing techniques, and more particularly, to methods and apparatus for retrofitting an in-ground drainage system with a drain pipe liner, thereby effectively repairing a buried pipeline without uncovering or replacing the entire pipe line.

As an illustrative environment for the present invention, in-ground drainage systems such as sewers, storm drains and the like, frequently employ a labyrinth of interconnected drain pipes with some of those buried drain pipes connected at respective ends to structures allowing access to those ends without the need for any excavation. Such pipe line end access structures, frequently take the form of conventional manholes.

In such illustrative in-ground drainage systems, there sometimes arises a need to repair or replace a given pipe line in the system, because of collapse, corrosion, leakage or other pipe line infirmity, depending upon the materials and construction techniques of the particular in-ground drainage system. Somewhat independent of the particular construction techniques and materials, are the techniques for repair or replacement. Such repair techniques require an excavation, at least at the particular pipe line trouble spot, and frequently an excavation of an entire pipe line section, so that that section may be replaced by new drain pipe. The cost of such an excavation and replacement, as well as the time required to accomplish the repair, make such a repair technique undesirably lengthy and costly.

A scheme that has met with some success in reducing the time and expense associated with such pipe line repairs, is to excavate an access area at one region of the pipe line and further to cut or break an access opening into the pipe line at the excavation location, then inserting a flexible pipe line of slightly smaller diameter into the access opening and along the defective pipe line, until that flexible smaller diameter pipe extends beyond the ends of the defective pipe line, whereupon the inserted pipe outer surface is sealed to the inner surface of the defective pipe near the opposite ends thereof, so that this new inner pipe assumes all responsibility for conveying materials along the route of the original defective pipe line. Such a technique is referred to as sliplining, with pipe manufactured of polyethylene or similar plastic-like material, frequently being used.

Temperature variations induce thermal expansion and contraction of such plastic pipe and corresponding increases or decreases in the axial length of the pipe. To minimize the deleterious effects of such axial length variations on the seals, such sliplined pipes are frequently allowed to remain in place in their new environment for a period of time, allowing the pipe to reach ambient temperature before the ends are sealed. Even with this precaution, thermally induced variations in length, as might be caused by the introduction of water significantly above or below the underground region around the pipeline, adversely affect the seals at the opposite ends of the pipe. Furthermore, since a slipline pipe is to assume the function of the defective pipe line into which it is placed, the inside diameter of that sliplined pipe which is necessarily smaller than the corresponding dimension of the original pipe, should be made as large as possible to approach the original capacity of the system. This leaves a relatively small annular space between the original and substitute pipes in which to achieve the seal. A scheme for quickly and easily effecting a seal between a pair of nested, generally coaxial, elongated pipes near the respective pipe ends, would be highly desirable.

Among the several objects of the present invention, may be noted the provision of improvements in methods of retrofitting in-ground drainage systems with drain pipe liners; the provision of improvements in schemes for effecting repair of buried pipe lines, without uncovering or replacing the entire pipe line; the provision of an improved arrangement for providing substantially, liquid tight seals between a pair of nested generally coaxial, elongated pipes, near the respective pipe ends, which seal is not damaged or destroyed by limited relative axial motion of the pipes as might, for example, be induced by temperature changes and dissimilar coefficients of thermal expansion; the provision of a pliable sleeve-like gasket for effecting a seal between a pair of coaxially positioned pipes; and the provision of a pliable sleeve-like gasket, which may be expanded outwardly to contact the inner surface of an outer pipe, and constricted inwardly to contact the outer surface of an inner pipe, thereby sealing an annular region between a pair of nested pipes. These as well as other objects and advantageous features of the present invention, will be in part, apparent and, in part, pointed out herein after.

In general, an elongated access opening is provided in a sidewall of a buried drain pipe, and a flexible liner fed into that opening and along the drain pipe, until the liner lead end reaches a drain pipe accessable end, whereupon the liner outer surface is sealed to the drain pipe inner surface. Preferably, this same sealing operation, is effected at the opposite ends of the liner and drain pipes, thus effectively retrofitting the in-ground drain pipe with a liner to effect the repair of a buried pipe line.

Also, in general, and in one form of the invention, a substantially liquid tight seal is effected between a pair of nested, generally coaxial pipes near the respective pipe ends, by providing at each end, a pliable, sleeve-like gasket having an outer circumference near one sleeve-end, which is approximately the same as the inner circumference of the outer pipe, and with an inner circumference near the opposite sleeve end, which is approximately the same as the outer circumference of the inner pipe, along with an expandable ring for forcing the sleeve, one end radially outwardly into sealing engagement with the outer pipe inner surface, and a contractable ring for constricting the sleeve other end, radially inwardly into sealing engagement with the inner pipe outer surface. An annular centering ring may be disposed near the sleeve-like gasket, intermediate the pipes, to maintain a generally coaxial relationship between those pipes.

BRIEF DESCRIPTION OF THE DRAWING

FIG. 1 is a view in cross section of an in-ground drainage system, illustrating the process of retrofitting an existing drain pipe with a drain pipe liner;

FIG. 2 is an enlarged cross sectional view of an arrangement for providing a liquid tight seal between the nested pipes of FIG. 1;

FIG. 3 is a partially broken away perspective view illustrating the pliable sleeve-like gasket, along with the contracting and expanding rings of FIG. 2 in greater detail.

Corresponding reference characters indicate corresponding parts throughout the several views of the drawing.

The exemplifications set out herein, illustrate a preferred embodiment of the invention in one form thereof, and such exemplifications are not to be construed as limiting the scope of the disclosure, or the scope of the invention in any manner.

DESCRIPTION OF THE PREFERRED EMBODIMENT

Referring first to FIG. 1, there is illustrated an in-ground drainage system, of the type employing buried pipe lines, such as 11, which is permanently connected as by sealing compounds or concrete at 13 and 15, to structures, such as conventional manholes 17 and 19, which allow access to the respective buried pipe line ends, without the need to dig up or uncover the pipe line. The access structures, such as manhole 17, frequently function to interconnect several different pipe lines, with lines 11, 21 and 23, juncturing in manhole 17. Such a manhole is frequently a concrete structure of a hollow nature, buried in the ground, and having a removable lid 25, as is well known in the art.

As noted earlier, the buried pipe line 11, may experience damage or develop leaks, either due to deterioration of the material from which the pipe line is constructed, or due to damage during initial installation, subsequent excavations, freezing, or by being simply overloaded, as by heavy vehicles driving over the area in which the pipe line is buried. Should the pipe line 11, need such repair, an excavation or hole 27 is dug, exposing a section of pipe line 11, and an elongated access opening 29 is cut into the upper surface of the existing drain pipe 11, exposing the interior of that drain pipe, and allowing the insertion of a flexible liner 31 through that access opening. The flexible liner 31 is fed along the interior of pipe 11, until the leading end 33 reaches and extends beyond an accessible end 35 of the original drain pipe. The flexible liner is extended beyond end 35, for example, on into another pipe 21, sufficiently far that the trailing edge 37 of the pipe being inserted, passes into the access opening 29, whereupon the direction of feed of flexible liner 31 is reversed moving the trailing end 37 toward another accessible end 39 of the original drain pipe, and with the flexible liner 31 having been cut to length just slightly longer than the original drain pipe 11, the flexible liner ultimately comes to rest with its two ends 33 and 37 extending slightly beyond the ends 35 and 39 of the original pipe, much as illustrated in FIGS. 2 and 3.

Preparatory to feeding the flexible liner 31 past drain pipe end 35, that drain pipe is provided with a pliable sleeve-like gasket 41, made of a plastic or rubber-like material and having a corrugated, or ribbed, outer circumference 43 near one end, having an outside circumference approximately the same as the inner circumference of outer pipe 11. The pliable sleeve-like gasket has a corrugated, or ribbed, inner surface 45 near the other end, with the inner circumference of that region being approximately the same as the outer circumference of pipe 31. Sleeve 41 is inserted part way into pipe 11 and an expandable ring 47 is expanded, as for example by a hydraulic tool, to urge the sleeve end radially outwardly, so that the ridged surface in the region 43 is in good sealing contact with the inner surface of the pipe 11. Thereafter, pipe 31 is fed through sleeve 41, to the position illustrated in FIG. 2, and a contractable ring such as 49 or 51, is positioned about sleeve 41 and tightened, constricting the sleeve end and ridged region 45, into good sealing contact with the outer surface of pipe 31. The contractable ring, such as 49 or 51 may, for example, be constructed similar to conventional hose clamps used in automotive cooling systems, with the threaded member 53 engaging a series of slots 55, so that as the threaded member 53 is rotated, the ring tightens about the sleeve gasket 41. A similar sleeve-like gasket 41, may similarly seal the two pipe ends, which are accessible in manhole 19, thus completing substitution of the inner pipe 31, for the original pipe 11.

In sliplining large diameter pipes, for example, having inside diameters of one foot or more, it is desirable to maintain the coaxial relationship between the existing pipe and the substitute pipe being inserted, by providing centering rings, such as the annular ring 57, which has an inside diameter near the outer diameter of the inner pipe 31, and an outside diameter near the inside diameter of the pipe 11. Such a centering ring 57, is optional when sliplining smaller buried pipe line. The centering ring may have tapering surfaces as illustrated, to facilitate both its insertion into the carrier pipe or original pipe 11, as well as to facilitate passage of the sliplined or inner pipe 31, therethrough.

Once the pipe liner 31 is in place, excavation 27 may be refilled either with or without any special attention to the access opening 29 in pipe 11. It is, however, desirable that the pipe 31 remain in its position for sufficient time to achieve thermal stability with its surroundings prior to sealing the ends so as to minimize the subsequent stress on the two sleeve-like gaskets 41. Also, the process of pulling or pushing the liner 31 into position, may actually stretch that liner, somewhat, and allowing some delay between positioning the liner within the pipe 11 and effecting the seal at the opposite ends, also provides time for the liner 31 to regain its original or undeformed shape, and particularly its original length. Some trimming may be effected on the ends of the slipline pipe 31, after it has thermally and deformationally stabilized, and this trimming may even be accomplished after the take-up clamps, such as 49 and 51, have been tightened about pipe 31.

The gaskets 41 and clamp 47 may be the same as disclosed in the patent application Ser. No. 287,049 filed July 27, 1981, William O. Skinner, inventor.

From the foregoing, it is now apparent that a novel method and apparatus for retrofitting an in-ground drainage system, with a drain pipe liner, have been disclosed meeting the ojbects and advantageous features set out here and before, as well as others, and that mofications as to the precise configurations, shapes and details, may be made by those having ordinary skill in the art, without departing from the spirit of the invention, or the scope thereof, as set out by the claims which follow.

What is claimed is:

1. The method of retrofitting an in-ground drainage system with a drain pipe liner comprising the steps of:
    providing an elongated access opening in an existing drain pipe;
    providing a flexible sleeve-like gasket;
    sealing a circumferential end portion of the outer surface of said flexible sleeve-like gasket to the drain pipe inner surface to provide a first seal;

feeding a flexible liner into the access opening along the drain pipe and through said gasket until the liner lead end reaches a drain pipe accessible end; and sealing a circumferential end portion of the inner surface of said flexible sleeve-like gasket to the flexible liner outer surface near the lead end thereof and adjacent said drain pipe accessible end to provide a second seal, said first and second seals being separated somewhat along the common axis of elongation of the drain pipe and liner, whereby a body portion of said sleeve-like gasket between said seals is free to flex to accommodate any expansion and contraction of said liner.

2. The method of claim 1 wherein the second seal is achieved by constricting a sleeve-like gasket about the liner.

3. The method of claim 2 wherein the first seal is achieved by radially expanding the sleeve-like gasket within the drain pipe.

4. The method of claim 1 wherein the drainage system is of the type having a plurality of spaced apart manholes providing access to drain pipe ends, the sealing steps being performed from within a manhole.

5. The method of claim 4 wherein the step of feeding includes passing the liner lead end beyond the drain pipe accessible end sufficiently far to allow the liner trailing end to enter the drain pipe through the access opening whereupon the liner is fed in an opposite sense until the trailing end reaches a drain pipe end in another manhole.

6. The method of claim 5 including the additional step of sealing the flexible liner outer surface near the trailing end to the inner surface of the drain pipe.

7. The method of claim 1 including the preliminary step of inserting an annular centering ring into the drain pipe accessible end, the annular centering ring having an outside diameter near the inside diameter of the drain pipe and an inside diameter near the outside diameter of the liner.

8. The method of claim 7 wherein the step of feeding includes passing the flexible liner through the centering ring to more closeley coaxially align the liner within the drain pipe.

9. The method of claim 1 including the additional step, between the step of feeding and the second sealing step of pausing to allow the temperature of the flexible liner to approach ambient temperature.

10. The method of effecting repair of a buried pipeline which is permanently connected at respective ends to structures allowing access to those ends without uncovering or replacing the entire pipeline between those structures comprising the steps of: uncovering a portion of the pipeline; cutting an access opening in the pipeline sidewall; feeding a flexible liner into the access opening and along the pipeline to position the liner within the pipeline with liner ends extending into the respective structures; sealing respective liner ends to the corresponding pipeline ends; and providing for some relative axial motion between the liner and pipeline without damage to the seal and slippage at the seal.

11. The method of claim 10 including the additional step of recovering the previously uncovered pipeline portion subsequent at least to the feeding step.

12. The method of claim 10 wherein the sealing step is accomplished at each liner end by providing a sleeve-like gasket, inserting the gasket into a pipeline open end, expanding an annular portion of the gasket into sealing engagement with an inner annular surface of the pipeline, passing the liner through the gasket, and contracting another annular portion of the gasket into sealing engagement with an outer annular surface of the liner.

13. The method of claim 10 including the preliminary step of inserting an annular centering ring into a pipeline end, the step of feeding including passing the flexible liner through the centering ring to more closely coaxially align the liner within the drain pipe.

14. The method of claim 10 including the additional step between the steps of feeding and sealing of pausing to allow the temperature of the flexible liner to approach ambient temperature.

15. The method of claim 10 wherein the step of feeding includes extending one liner end beyond the corresponding pipeline end sufficiently far to pass the opposite liner end through the access opening and thereafter moving the opposite liner end toward its corresponding pipeline end.

* * * * *